United States Patent [19]

Brown

[11] Patent Number: 4,549,630

[45] Date of Patent: Oct. 29, 1985

[54] CONTINUOUS SHEAR WAVE LOGGING APPARATUS

[75] Inventor: Graydon L. Brown, Ponca City, Okla.

[73] Assignee: Conoco Inc., Ponca City, Okla.

[21] Appl. No.: 477,641

[22] Filed: Mar. 21, 1983

[51] Int. Cl.[4] .......................... G01V 1/16; G01V 1/40; G01V 1/053

[52] U.S. Cl. ...................................... 181/106; 367/31; 367/75; 181/401

[58] Field of Search ...................... 367/27, 31, 75, 912; 181/104, 106, 108, 113, 121, 401

[56] References Cited

U.S. PATENT DOCUMENTS

| | | | |
|---|---|---|---|
| Re. 31,607 | 6/1984 | Voget et al. .......................... | 367/75 |
| 2,428,168 | 9/1947 | Loper .................................... | 181/401 |
| 2,483,770 | 10/1949 | Hildebrant ......................... | 181/401 |
| 3,280,935 | 10/1966 | Brown .................................. | 367/189 |
| 3,346,066 | 10/1967 | Miller et al. ......................... | 181/106 |
| 3,353,622 | 11/1967 | Erickson .............................. | 181/106 |
| 3,354,983 | 11/1967 | Erickson et al. ..................... | 367/75 |
| 3,475,722 | 10/1969 | White ................................... | 367/31 |
| 4,310,066 | 1/1982 | Won ...................................... | 181/401 |
| 4,380,806 | 4/1983 | Waters et al. ........................ | 367/75 |
| 4,394,754 | 7/1983 | Waters ................................. | 367/75 |

Primary Examiner—Nelson Moskowitz
Attorney, Agent, or Firm—William J. Miller

[57] ABSTRACT

Apparatus for continuous shear wave logging of a borehole consisting of a sonde instrument having retractable, expandable coupling arms for rigidly engaging the borehole wall to exert repetitive torqueing action while continuously moving uphole. The sonde includes spaced detector coupling arms in continual contact with the borehole wall and polarized for detection of the repetitive propagated shear waves.

8 Claims, 5 Drawing Figures

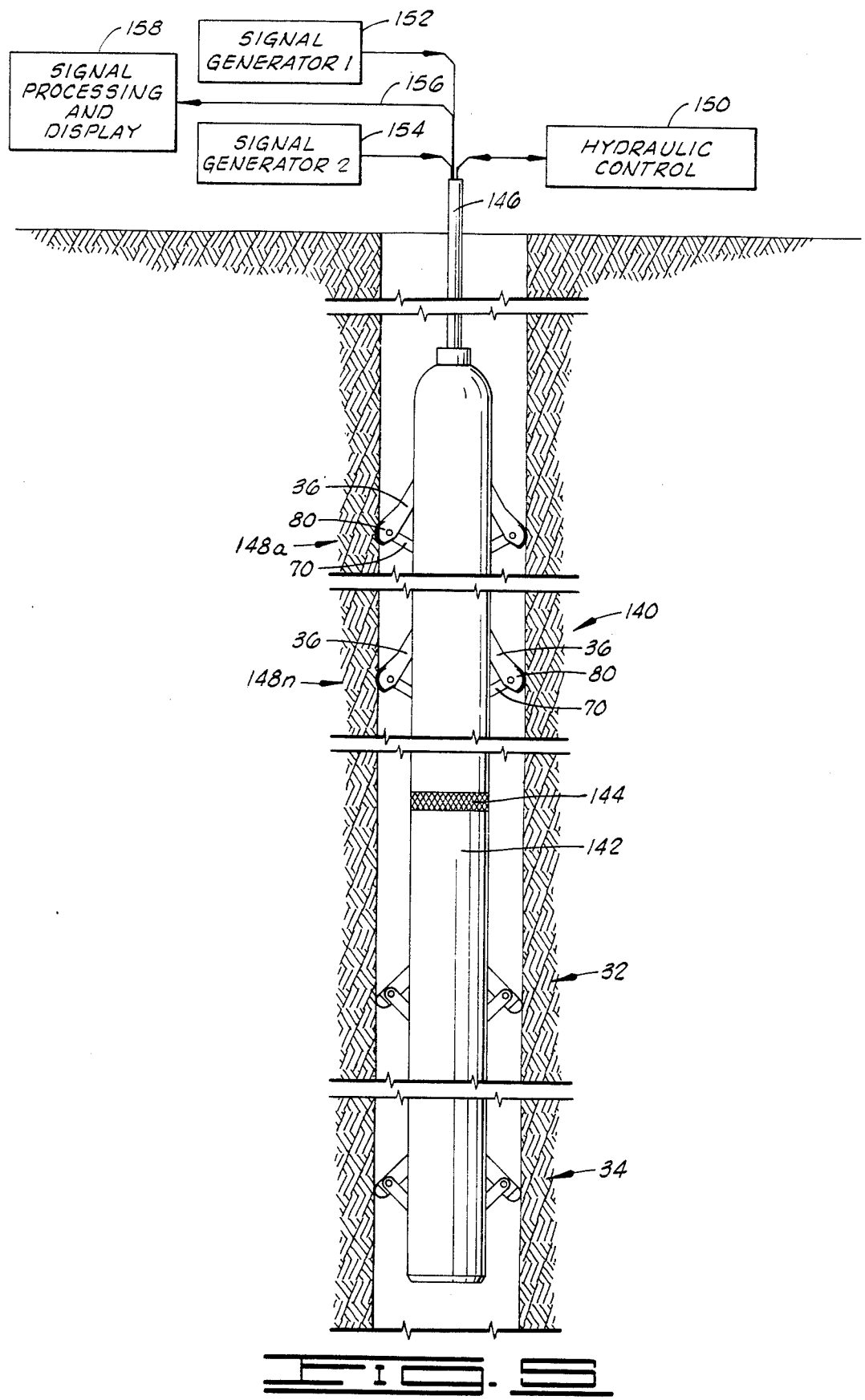

CONTINUOUS SHEAR WAVE LOGGING APPARATUS

BACKGROUND OF THE INVENTION

1. Field of the Invention

The invention relates generally to shear wave velocity logging apparatus and, more particularly, but not by way of limitation, it relates to an improved structure for generation of torsional shear waves within a borehole for subsequent detection and processing to determine travel times, phase differences or the like of received signals thereby to derive indication of shear wave velocity in the adjacent formation.

2. Description of the Prior Art

The prior art includes various types of shear wave and compressional wave logging sonde which are operational downhole, either by transmitting energy through the borehole fluid or directly into the earth formation, to generate wave energy for subsequent detection. Designs have been various to combat problems encountered with systems utilizing the diverse forms of wave generation and encountering the differing propagation paths. That is, initial generation of P waves (compressional) into borehole fluid and the borehole wall interface result in a transformed shear wave transmitted along the borehole proximate formation which, in turn, is transformed back to compressional wave in the fluid for detection by the sonde instruments, and generation of P waves or shear waves directly into the borehole wall results in yet a different mode of energy transfer along the formation. Borehole measurements of velocity ($V_{sh}$) by shear wave converted from a P wave source have proven quite difficult to interpret in any consistent manner. A detected wave train includes each of compressional, shear and Rayleigh waves in overlapping presence such that detection and definition is difficult at best.

The closest prior art known to Applicant is U.S. Pat. No. 3,354,983 in the name of Erickson et al, as assigned to the common assignee, and this patent discloses the use of shear waves as directly induced into the borehole wall for subsequent detection at spaced intervals and velocity signal processing. This device utilizes pressure feet for engaging extensible transducers into the borehole wall, but it may be readily noted that this device is not suitable for continuous logging and must be actuated and de-actuated at each positioning of the device to enable an energy propagation and detection sequence.

SUMMARY OF THE INVENTION

The present invention provides apparatus for generating and detecting shear waves by torqueing the borehole periphery while also allowing the source and detector combine to be pulled up the borehole while continuously logging shear wave travel times, and hence determining velocities in the adjacent formations. The sonde apparatus of the present invention includes an elongated frame and pluralities of detector coupling arms secured in spaced relationship to a source position. The source position includes a plurality of coupling arms that include a knife edge for engaging the borehole wall, as each is extensible outward into engagement in response to a hydraulic actuator and lower hub plate that functions to move extender links upward to extend the coupling arms. The similar hydraulically actuated structure is utilized to extend each of a plurality of detector coupling arms outward into engagement with the borehole wall at one or more detector positions. Thus, the source coupling arms are torqued by a rotary actuator which, in turn, torques or twists the borehole to impart a narrow, ring source torsional shear wave. Alternative structure provides for at least two transducer positions, each having a plurality of knife-edged coupling arms which may be oppositely torqued at successive times to provide a dipole source, and shear wave energy from the dipole source is similarly detected and processed for pulse travel time, phase delay or the like to provide data relating to the adjacent formations.

Therefore, it is an object of the present invention to provide a shear wave borehole logging apparatus that provides more accurate detected data relative to adjacent formations.

It is also an object of the invention to provide borehole logging apparatus which can be run continuously along the borehole during repeated energy propagation and detection sequences.

It is still further an object of the invention to provide continuous logging apparatus capable of rapidly determining shear wave velocities in formations adjacent a borehole.

Finally, it is an object of the invention to provide sonde apparatus which is relatively simple yet highly reliable in providing torsional shear wave energy propagation into a borehole wall, and which is capable of such propagation as well as simultaneous detection of vertical shear energy during continuous traverse of the borehole.

Other objects and advantages of the invention will be evident from the following detailed description when read in conjunction with the accompanying drawings which illustrate the invention.

BRIEF DESCRIPTION OF THE DRAWINGS

FIG. 4 is a block diagram of the essential hydraulic and electrical control structure of the present invention; and FIG. 5 is an idealized view in elevation of an alternative form of sonde in operative position within a borehole.

DETAILED DESCRIPTION OF THE INVENTION

Figure 1:
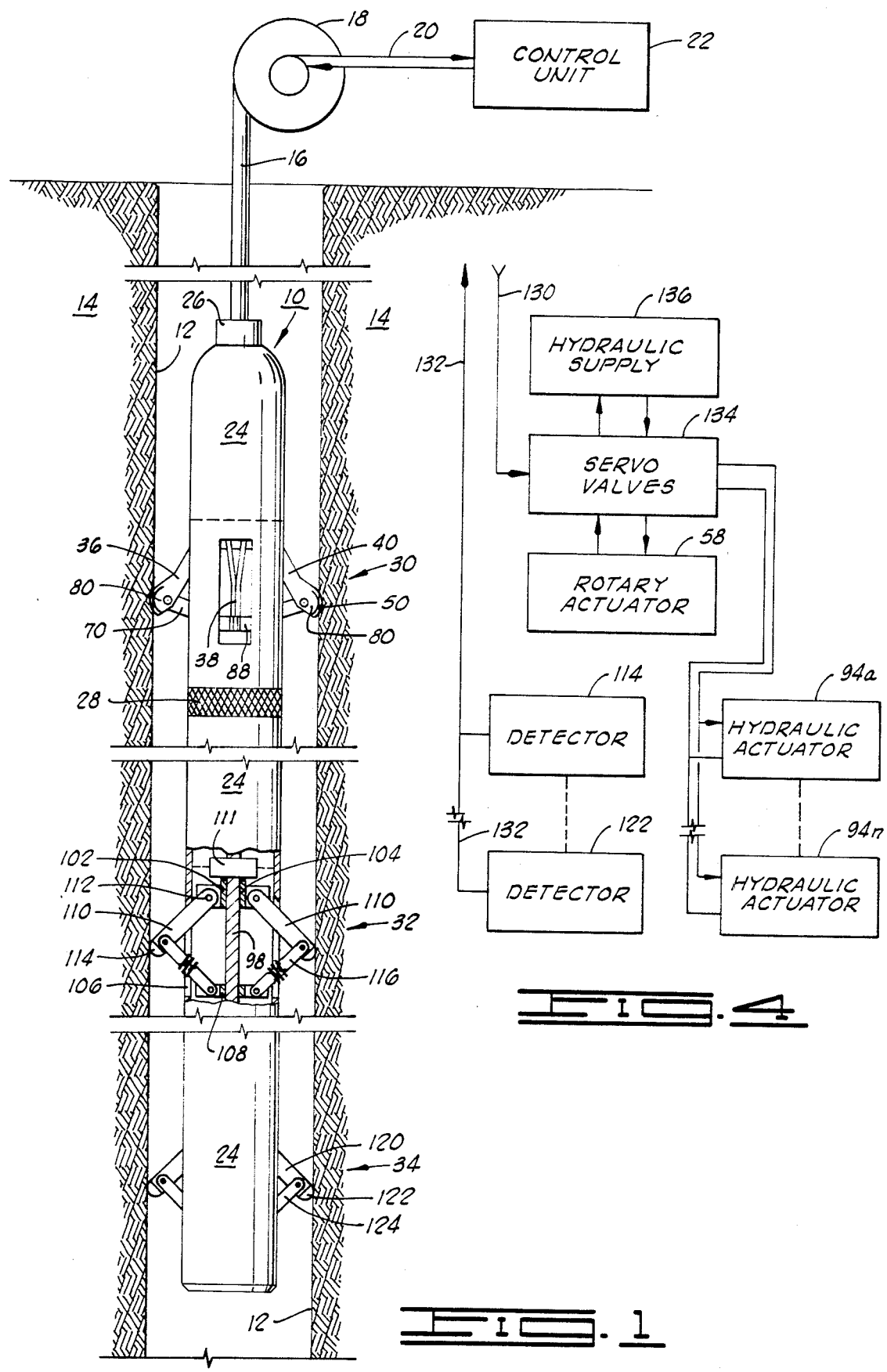
FIG. 1 is an idealized view in elevation of a borehole sonde constructed in accordance with the present invention.

Referring to FIG. 1, a logging sonde 10 is supported in a borehole 12 as formed in earth 14. The sonde 10 is supported movably in borehole 12 by means of a standard type of logging cable 16 extending from a winch assembly 18 located on the earth surface. The logging cable 16 may include both hydraulic and electrical actuation conduits and electrical signals are applied through winch assembly 18 via conductors 20 to the control unit 22 in conventional manner.

The sonde apparatus 10 may consist of such as an outer, cylindrical frame member 24 having an upper end cap 26 that is adapted for affixing logging cable 16 to the sonde 10. The cylindrical frame member 24 may include an elastomeric mid-section 28, e.g. a ruggedized acoustic vibration isolation substance, to eliminate or greatly dampen interfering vibrations along the body of sonde 10. The sonde 10 includes a set of source coupling arms 30 as well as one or more sets of detector coupling arms 32, 34, etc.

Figure 2:
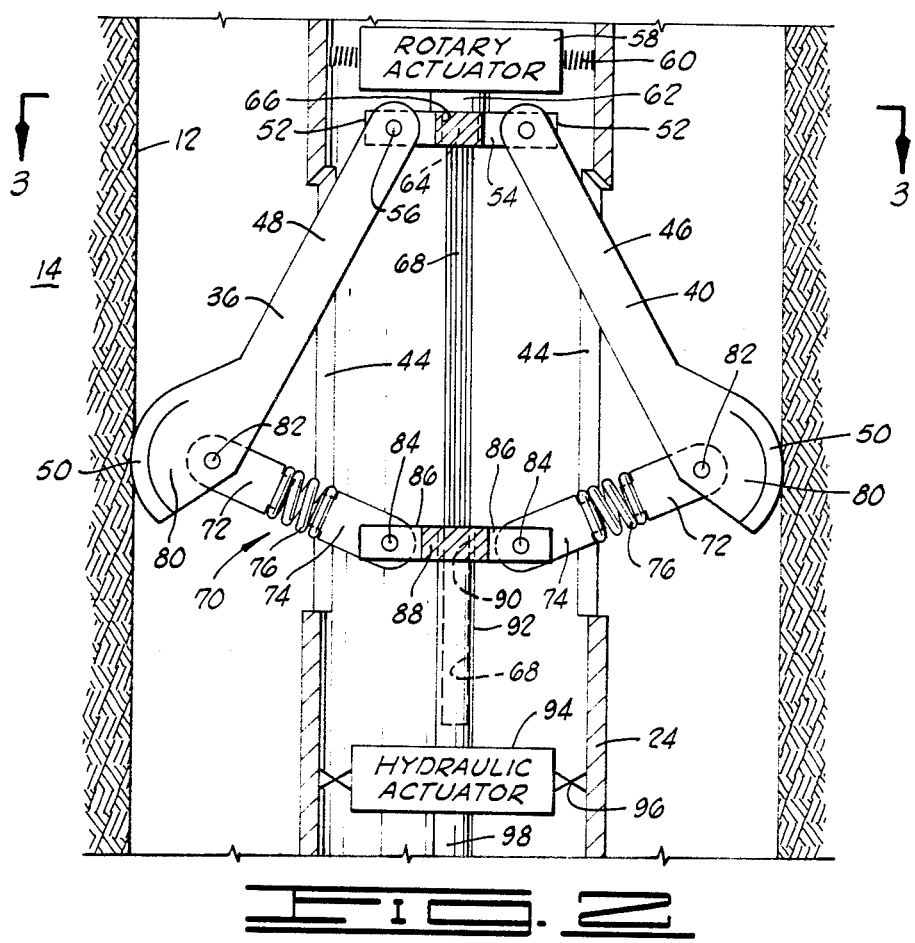
FIG. 2 is a vertical section of a portion of the sonde of FIG. 1.
Figure 3:
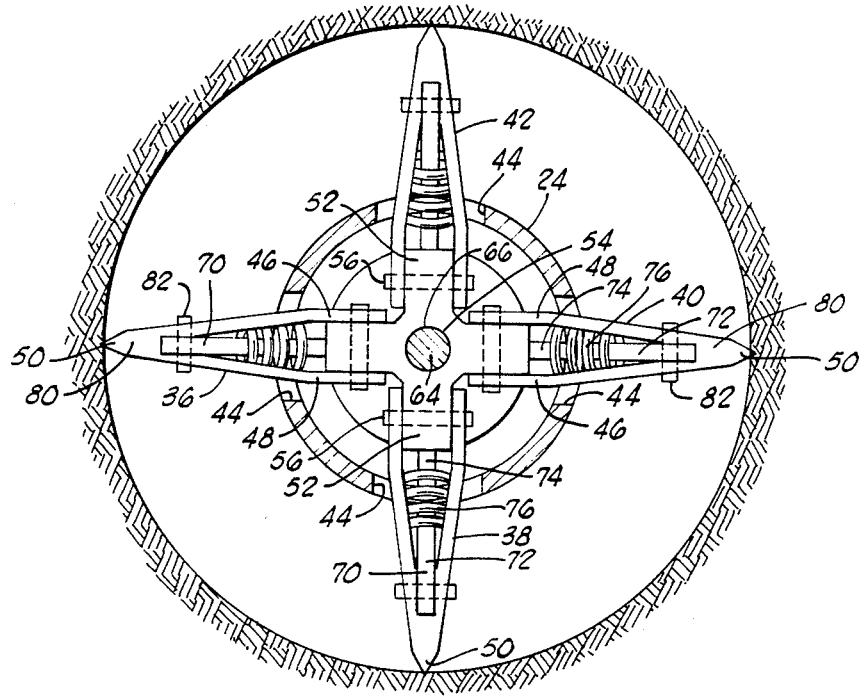
FIG. 3 is a horizontal section taken across lines 3—3 of FIG. 2.

The source arm set 30 is shown as a quadrature array but may consist of two or more equally spaced coupling arms. Thus, as shown also in FIGS. 2 and 3, coupling arms 36, 38, 40 and 42 are arrayed within sonde frame 24 for extension outward through a respective one of quadrature arrayed slots 44 for engagement with the wall of borehole 12. Each of source coupling arms 36–42 is a V-shaped member having bifurcated ends 46 and 48 adapted for pivotal affixure while the unit end is formed with a respective knife edge 50 for secure engagement within the borehole wall. Each of the bifurcated ends 46 and 48 is pivotally affixed to a respective quadrature aligned block 52 of an upper hub plate 54 by means of a horizontal pivot pin 56.

A rotary actuator 58 is suitably mounted within cylindrical frame 24 in rotationally resilient manner as shown generally by securing structure 60. Any of various securing techniques may be utilized so long as the rotary actuator 58 is maintained axially secure within frame 24 while remaining relatively isolated rotationally. The rotary actuator 58 includes an output shaft assembly 62 having an interlocking coupling 64 as is securely received within bore 66 of hub plate 54. The coupling 64 then securely receives a spline shaft 68 to impart positive rotational force. The rotary actuator 58 may be selected from various commercially available torqueing mechanisms, e.g. either a hydraulic torquer or an electric motor device, or it may be a torsional source such as that disclosed in U.S. Pat. No. 3,280,935 entitled "SEISMIC TORSIONAL WAVE GENERATOR".

The lower or unit end of bifurcated coupling arms 36–42 are each supported by a respective extender link 70 consisting of link ends 72 and 74 resiliently secured together by means of a compliance spring 76. Each of the quadrature arrayed extender links 70 are pivotally affixed between the coupling arm engaging heads 80 by means of respective pivot pins 82, and the respective inner link ends 74 are pivotally attached by means of pivot pins 84 within respective blocks 86 of a lower hub 88 having a spline bore 90 that is slidably received over spline shaft 68. Alternatively, solid, non-compliant extender links 70 might be utilized in a set of three capable of contacting properly in eccentric hole situations.

The underside of hub 88 is suitably secured to a cylinder shaft 92 which is extendable axially in response to actuation of a hydraulic actuator 94 secured within cylindrical frame 24, as shown generally by securing means 96. The hydraulic actuator 94 may be any suitable type of actuating cylinder for controlling axial elongation of cylindrical shaft 92 to urge the hub 88 upward or downward on spline shaft 68 thereby to position the engaging knife edges 50 firmly within the borehole wall. Hydraulic actuator 94 may also include additional lower shaft structure 98 for enabling operative positioning of lower transducer arms such as the detector arms 32 and 34 (FIG. 1).

Referring again to FIG. 1, the detector arrays 32, 34, etc., as located below sonde frame 24 are similarly hydraulically actuated into detecting position with the coupling arms engaged on the sides of the earth borehole 12. As shown in FIG. 1, a stationary cylindrical block 102 having central bore 104 is secured longitudinally rigid within frame 24 adjacent a plurality of cylindrically arrayed detector slots 106 to allow a hydraulic actuator shaft 98 to pass freely through central bore 104 for secure engagement with a lower hub 108. A plurality of coupling arms 110 are pivotally secured to cylindrical block 102 by means of pivot pins 112 and respective torsional or shear wave detectors 114 may be maintained in engagement with the borehole wall 12 by means of extender links 116 pivotally attached between the lower hub 108 and the lower end of a respective detector coupling arm 110. Alternatively, coupling arms 110 may be the knife edge type (arms 36) effective to transmit received torque shear movement to a torque sensing device 111 as secured within frame member 24. In this mode, the torque generator actuator 58 and sensing device 111 may be oppositely functioning electromechanical devices, viz. motor and generator.

Thus, hydraulic actuation of shaft 98 upward will bring lower hub 108 upward toward the stationary upper hub 102 thereby to urge the detector coupling arms 110 outward into transducing or torquing contact with the borehole wall. The actuator shaft 98 may also be extended below the hub 108 through a next lower succeeding cylindrical block of stationary type and into contact with a movable lower hub to effect similar actuation of the sensing array 34, i.e. a plurality of detector coupling arms 120 bearing detectors 122 (or knife edge) as urged into operative position by means of extender links 124.

FIG. 4 shows generally a form of downhole control system that may be utilized in the present invention. The logging cable 16 may include a plurality of electrical interconnections such as connection 130 conveying signal and power downhole and connection 132 which conducts detected signal indications uphole for signal processing and data output display. Actuation control of the downhole connector 130 may be applied to a conventional form of servo valve 134 which functions with a hydraulic supply 136 to provide positioning actuation of respective one or more hydraulic actuators 94a–94n. Surface control via connector 130 through a servo valve control 134 is also used to periodically actuate the rotary actuator 58 to impart the torsional shear wave energy into the borehole wall. Detected shear wave energy, as picked up by one or more detectors 114–122, is then conducted uphole by means of connector 132 as signal is returned to the control unit 22 (FIG. 1) for processing and output display.

In operation, the sonde 10 (FIG. 1) may be lowered to a specified depth within borehole 12 by means of operating the winch 18 to extend logging cable 16. Thereupon, surface actuation can energize each of hydraulic actuators 94a–94n to extend all of the coupling arms for the various source array 30, and detector arrays 32 and 34. Each of the plurality of source coupling arms 36–42 and detector coupling arms 110, 120 are expansibly but compliantly urged outward by their respective extender links so that the source knife edges 50 of coupling arm heads 80 are engaged in the borehole wall, and each of the shear wave detectors 114, 122 are in firm contact with the borehole wall. Thereafter, the winch 18 is operated to draw the sonde 10 uphole at a selected, constant rate. As the sonde 10 traverses upward, the rotary actuator 58 is repetitively energized to torque the borehole and the torsional shear wave energy is detected by one or more of the detector arrays 32–34 for conduction uphole to the surface processing equipment within control unit 22.

The system may be operated with an impulse source from source array 30 to derive shear wave velocity from measured transit time between the source array 30 and the detector arrays 32 and/or 34. That is, travel time divided by the distance between the source array 30 and the respective detector array or, between spaced detector arrays. Alternatively, lower frequency excitation may be utilized with subsequent measurement of the steady state phase in accordance with the following relationship:

$$V_s = \frac{d\phi}{Sd\omega} = \frac{dT}{S} \tag{1}$$

where $d\phi$ and $d\omega$ are measured in consistent units, i.e. either radians and radians per second or cycles and cycles per second. For most applications, a single frequency and phase will be adequate for measurements. If desired, the use of two simultaneous frequencies with coherent detection by phase lock loop would allow continuous tracking and rejection of noise as well as full resolution of any measurement ambiguities. Also, swept frequency control signals can be utilized.

FIG. 5 illustrates an alternative form of borehole sonde 140 which is constructed to utilize a plurality of expansible source coupling arms as well as one or more expansible detector arrays therebelow. Here again, a cylindrical frame 142 which includes a centrally located acoustic isolation interconnect 144 is adapted in well-known manner for suspension by means of a logging cable 146. The sonde 142 may include a plurality of torsional wave sources such as 148a through 148n, each source array consisting of plural, balanced coupling arms 36 having knife-edged coupling arm heads 80 as expansibly extended by compliant extender links 70. The source arrays 148a–n can be operated from a respective hydraulic actuator to expand into operative position, and a respective rotary actuator 58 (FIG. 2) may then effect torsional shear wave generation through the interconnecting spline shaft mechanism such as shaft 68 of FIG. 2. The plural detector portion or lower portion of sonde 140 may simply be a duplication of the structure of FIG. 1 as it includes plural detector arrays 32 and 34.

Hydraulic control of the sonde 140 is effected from a surface located hydraulic control 150 which provides electrical signal downhole to the usual hook-up of servo valves to control full function from a hydraulic supply to the rotary actuators and coupling arm actuators. A pair of signal generators 152 and 154 may provide control signal input at the same frequency 180° displaced down the logging cable 146 to effect operation of the rotary actuator and source generation rate. It is also contemplated that the signal generators 152 and 154 may be operated at different yet optimum selected frequencies as might be selected with knowledge of prior responses in the similar terrain. Output from the detector arrays 32 and 34 is then provided on a conductor 156 for input to the signal processing and display stages 158.

In operation, the apparatus of FIG. 5 enables a horizontal dipole source and receiver within the borehole that can be repetitively energized as it is continuously drawn uphole by means of the logging cable 146. Thus, the two complete sets of source arrays 148a–148n may be driven oppositely simultaneously by their respective rotary actuators, thus providing a dipole source. In response then, the receiver or detector arrays 32 and 34 may include torsional wave detectors that are configured for detection of oppositely polarized signals.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are defined as follows:

1. Sonde apparatus for continuous shear wave logging of a borehole, comprising:
    frame means;
    means supporting said frame means for selected continual movement along said borehole;
    plural coupling arms retractably secured in said frame means, each coupling arm having an upper end and a lower end with a knife edge coupling surface for engagement with the borehole wall;
    means for actuating the plural coupling arm lower end knife edge coupling surface into torsionally rigid contact with the borehole; said means maintaining said coupling surfaces in torsionally rigid contact with the borehole as said support means moves said frame means along said borehole;
    means connecting the coupling arm upper ends and lower ends for concerted rotary movement; and
    rotary actuator means secured to said frame means for imparting rotary impulse movement through said means connecting to rotate said lower end coupling surfaces thereby to torque the periphery of the borehole and generate torsional shear wave energy in the adjoining erth formation.

2. Sonde apparatus as set forth in claim 1 which is further characterized to include:
    at least two torsion detector coupling arms retractably secured in said frame means, each having an upper end and a lower end;
    means responsive to torsional coupling arm movement to produce a detected signal;
    means for actuating said detector coupling arm lower ends into contact with the borehole wall; and
    means conducting detected signal for subsequent processing.

3. Sonde apparatus as set forth in claim 2 which is further characterized in that:
    the coupling surfaces are disposed at a predetermined vertical distance from said detector coupling arms to define a known shear wave travel distance.

4. Sonde apparatus as set forth in claim 1 wherein said means connecting comprises:
    an output shaft from said rotary actuator means;
    an upper hub plate connected to said output shaft to receive intermittent rotary drive;
    means including a pivot pin pivotally affixing the coupling arm upper ends to a respective peripheral position on the hub plate;
    a lower hub plate slidably disposed on said rotary actuator means output shaft and being vertically positionable by said means for actuating; and
    extender links pivotally connected between said lower hub plate and said lower end coupling surfaces.

5. Sonde apparatus a set forth in claim 4 wherein: said extender links each include:

compliance spring means disposed intermediate the ends of the extender links to allow length variation to accommodate borehole diameter changes.

6. Sonde apparatus as set forth in claim 4 wherein:
said output shaft is a spline shaft connected through said upper hub plate and spline-connected slidably through said lower hub plate.

7. Sonde apparatus as set forth in claim 1 which is further characterized to include:
at least two detector coupling arms retractably secured in said frame means, each having an upper end and a lower end with shear wave detector;
means for actuating said detector coupling arm lower end detectors into contact with the borehole wall; and
means conducting detected signal for subsequent processing.

8. Sonde apparatus as set forth in claim 2 which is further characterized in that:
the coupling surfaces are disposed at a predetermined vertical distance from said shear wave detectors to define a known shear wave travel distance.

* * * * *